W. D. JOHNSON.
Seed-Planter.

No. 67,656. Patented Aug. 13. 1867.

Witnesses:
John D. Bloor
J. Franklin Reigart

Inventor:
W. D. Johnson
By his Atty
Johns Herringohin

United States Patent Office.

W. D. JOHNSON, OF RALEIGH, NORTH CAROLINA.

Letters Patent No. 67,656, dated August 13, 1867.

---

IMPROVEMENT IN SEED-PLANTER.

---

The Schedule referred to in these Letters Patent and making part of the same.

---

TO ALL WHOM IT MAY CONCERN:

Be it known that I, W. D. JOHNSON, of Raleigh, county of Wake, and State of North Carolina, have invented new and useful Improvements in Seed-Planters; and I do hereby declare the following to be an exact description thereof, reference being had to the accompanying drawings, and to the letters of reference marked thereon, making a part of this specification, in which—

Figure 1:
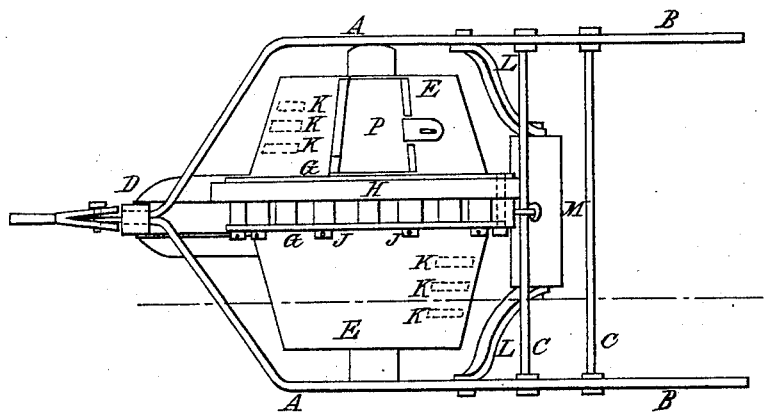

Figure 1 represents a top view of the machine.

Figure 2:
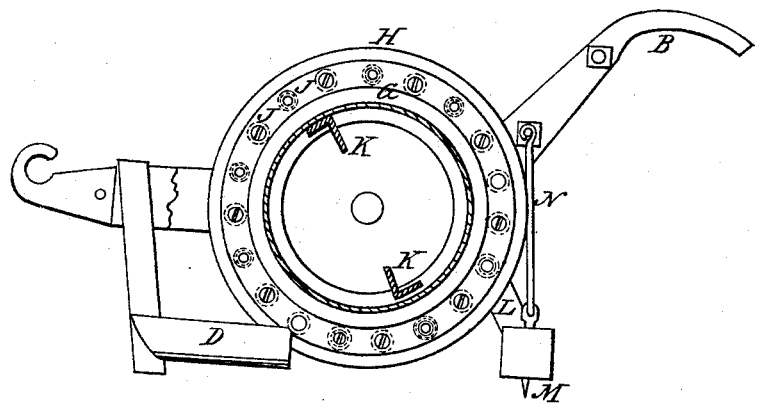

Figure 2, a sectional elevation.

The nature of my invention consists in a double conical hopper, with a wheel in the centre, and the apertures for seeding at the centre, arranged with a plough in front and a harrow in the rear.

A represents the frame; B, the handles; C, the rounds that support the handles; D, the plough in front for making the furrow; E E are the conical hoppers to hold the seed. They are made of sheet iron, and riveted together at their flanges G G, on each side of the periphery of a centre-wheel, H, with a space on one side of the wheel, formed by small tubes, through which the screws and rivets J pass, and that form the apertures for the grain to fall through, the apertures being increased or diminished in number by taking out one or more of the screws J, so as to widen the space between two of the screws or rivets J. The wheel runs in the furrow made by the plough D in front, and as the hoppers E revolve with the wheel H. There are forked projections K K on the inside of each hopper E to stir up the seed to sow without choking or irregularity. The wheel is intended to be one and one-eighth inch thick and twenty-seven inches in diameter. Two drag-bars L L, pivoted to the frame A, are fastened to harrow M, that is adjustable, and raised or lowered by a hook, N, to catch in the upper or lower round C, to be hooked to the lower round when in operation, to cover up the furrow, or to be hooked in the upper round C when not in use. P is a door in the hopper to insert the seed.

What I claim as my invention, and desire to secure by Letters Patent, is—

The construction of the conical hopper E, with its stirrers K and centre-wheel H, when arranged and operated with a plough, D, in front and harrow M in the rear, as herein described and for the purposes set forth.

W. D. JOHNSON.

Witnesses:
    JOHN S. HOLLINGSHEAD,
    JOHN D. BLOOR.